US011607695B2

(12) United States Patent
Park et al.

(10) Patent No.: US 11,607,695 B2
(45) Date of Patent: Mar. 21, 2023

(54) ELECTRIFICATION DEVICE AND ELECTRICAL DUST COLLECTING APPARATUS INCLUDING THE SAME

(71) Applicant: Hanon Systems, Daejeon (KR)

(72) Inventors: Ji-Yong Park, Daejeon (KR); Ki Hong Kim, Daejeon (KR); Jae Ho Kim, Daejeon (KR)

(73) Assignee: Hanon Systems, Daejeon (KR)

(*) Notice: Subject to any disclaimer, the term of this patent is extended or adjusted under 35 U.S.C. 154(b) by 486 days.

(21) Appl. No.: 16/724,665

(22) Filed: Dec. 23, 2019

(65) Prior Publication Data
US 2020/0230611 A1 Jul. 23, 2020

(30) Foreign Application Priority Data
Jan. 18, 2019 (KR) .................. 10-2019-0006627

(51) Int. Cl.
*B03C 3/47* (2006.01)
*B03C 3/08* (2006.01)
*B01D 46/00* (2022.01)

(52) U.S. Cl.
CPC ............ *B03C 3/47* (2013.01); *B01D 46/0032* (2013.01); *B03C 3/08* (2013.01); *B03C 2201/04* (2013.01)

(58) Field of Classification Search
CPC combination set(s) only.
See application file for complete search history.

(56) References Cited

U.S. PATENT DOCUMENTS

| 3,997,304 A * | 12/1976 | Carr .......................... B03C 3/86 96/90 |
| 9,457,118 B2 * | 10/2016 | Ota .......................... F24F 8/192 |
| 2007/0028775 A1 * | 2/2007 | Loup .......................... B03C 3/41 96/96 |
| 2015/0290352 A1 | 10/2015 | Ota et al. |
| 2020/0179946 A1 * | 6/2020 | Yu .............................. B03C 3/82 |

FOREIGN PATENT DOCUMENTS

| CN | 1735775 A | 2/2006 |
| CN | 206778712 U | 12/2017 |
| KR | 20040007007 A | 1/2004 |
| WO | 2018143742 A2 | 8/2018 |

OTHER PUBLICATIONS

Office Action dated Aug. 3, 2022 by the CIPO in the corresponding Patent Application No. CN 202010052226.1, with English translation.

* cited by examiner

*Primary Examiner* — Christopher P Jones
*Assistant Examiner* — Sonji Turner
(74) *Attorney, Agent, or Firm* — Norton Rose Fulbright US LLP; James R. Crawford

(57) ABSTRACT

The following disclosure relates to an electrification device and an electrical dust collecting apparatus including the same capable of adsorbing and filtering fine dust included in air in an air conditioning apparatus such as an air conditioner or an air cleaner, and more particularly, to an electrification device and an electrical dust collecting apparatus including the same capable of having uniform electrification by fixing an electrification plate and a wire at accurate positions using a fixing member coupled to a case to support both end portions of the electrification plate and the wire.

11 Claims, 9 Drawing Sheets

FIG. 2                                    Prior Art

ELECTRIFICATION DEVICE AND ELECTRICAL DUST COLLECTING APPARATUS INCLUDING THE SAME

CROSS-REFERENCE TO RELATED APPLICATIONS

This application claims priority under 35 U.S.C. § 119 to Korean Patent Application No. 10-2019-0006627, filed on Jan. 18, 2019, in the Korean Intellectual Property Office, the disclosure of which is incorporated herein by reference in its entirety.

TECHNICAL FIELD

The following disclosure relates to an electrification device and an electrical dust collecting apparatus including the same capable of adsorbing and filtering fine dust included in air in an air conditioning apparatus such as an air conditioner or an air cleaner, and more particularly, to an electrification device and an electrical dust collecting apparatus including the same capable of having uniform electrification by fixing an electrification plate and a wire at accurate positions using a fixing member coupled to a case to support both end portions of the electrification plate and the wire.

BACKGROUND

An electrical dust collecting apparatus is widely used in an air conditioning apparatus, a humidistat or the like, of a building and a vehicle, and discharges dust particles to have selected specific electric charges through a corona discharge phenomenon and the collects the dust particles by an electrical attractive force in a dust collecting device.

As illustrated in FIGS. 1 and 2, the electrical dust collecting apparatus described above mainly includes an electrification device 10 and a dust collecting device 20. The electrification device 10 includes a case 11 formed to be hollowed in a direction in which dust is introduced and having a frame shape, electrification plates 12 fixed to the case 11 and formed in parallel with the direction in which the dust is introduced, and a wire 14 provided between the electrification plates 12. In this case, a high voltage is applied to the wire 14 to allow the dust particles to have specific electric charges through a corona discharge phenomenon between the electrification plates 12 and the wire 14. In FIG. 2, portions of the wire provided between the electrification plates 12 are denoted by reference numeral 14a, and portions of the wire connecting these portions to each other are denoted by reference numeral 14b.

The dust collecting device 20 collects the dust particles having the specific electric charges through the discharge in the electrification device 10 as described above by an electrical attractive force using opposite electric charge characteristics.

Particularly, the dust collecting apparatus generates the discharge phenomenon between the electrification plate and the wire to allow the dust particles to have the specific electric charges. In this case, the electrification plate needs to be disposed at an accurate position in order to achieve uniform discharge.

Meanwhile, conventionally, a technology of punching, bending, and assembling one electrification plate has been suggested. However, in a case in which the bent electrification plate is not disposed at an accurate position, it is difficult for the discharge to be effectively achieved, and an abnormal discharge phenomenon between the electrification plate and the wire may occur.

Therefore, a technology for an electrical dust collecting apparatus that may be easily manufactured and may achieve uniform and stable electrification has been demanded.

RELATED ART DOCUMENT

Patent Document (Patent Document 1) Korean Patent Publication No. 10-0495627 (entitled "Electronic Dust Collecting Apparatus using Urethane Filter" and published on Jun. 27, 2005)

SUMMARY

An embodiment of the present invention is directed to providing an electrification device and an electrical dust collecting apparatus including the same capable of having uniform electrification by fixing an electrification plate and a wire at accurate positions using a fixing member coupled to a case to support both end portions of the electrification plate and the wire.

Particularly, an embodiment of the present invention is directed to providing an electrification device and an electrical dust collecting apparatus including the same in which a position of an electrification plate may be accurately supported through a fixing member (or a fixing member and a case) and protrusion portions and a single wire may be supported by a wire support portion so that it may be bent and extend between neighboring electrification plates.

Further, an embodiment of the present invention is directed to providing an electrification device and an electrical dust collecting apparatus including the same in which a fixing member may surround and fix both end portions of an electrification plate and perform an insulation role, and a blocking portion may block between the electrification plate and a wire to prevent abnormal electrification between the electrification plate and the wire adjacent to the electrification plate, thereby enabling stable electrification and improving entire electrification efficiency.

In one general aspect, an electrification device 100 for an electrical dust collecting apparatus, applying electric charges to dust particles introduced from the outside includes: a case 110 having a frame shape; electrification plates 120 coupled to the case 110 to electrify electric charges and having a shape of a plate parallel with a direction in which the dust particles move; a wire 140 disposed to be spaced apart from the electrification plates 120 and be in parallel with the electrification plates 120 and having a high voltage applied thereto; and a pair of fixing members 130 coupled to the case 110 and supporting both end portions of the electrification plates 120 and the wire 140.

In addition, concave seating portions 111 may be formed in the case 110 so that both end portions of the electrification plates 120 are seated.

In addition, first reinforcing portions 113 connecting both sides of the case 110 to each other in a direction in which the electrification plates 120 are mounted may be formed integrally with the case 110.

Further, some of the first reinforcing portions 113 may support one sides of the electrification plates 120 in the direction in which the dust particles move.

In addition, second reinforcing portions 114 connecting both sides of the case 110 in a direction perpendicular to the first reinforcing portions 113 to each other may be formed integrally with the case 110.

Further, the case 110 may include first and second protrusion portions 115 and 116 protruding from the second reinforcing portions 114 and supporting both side surfaces of the electrification plates 120.

In addition, the first protrusion portions 115 and the second protrusion portions 116 may be provided in the second reinforcing portions 114 so as to be spaced apart from each other by a predetermined distance in a length direction of the electrification plates 120.

In addition, the case 110 may include concave first groove portions 114a formed between the first protrusion portions 115 and the second protrusion portions 116 of the second reinforcing portions 114 so that one sides of the electrification plates 120 are inserted.

Further, the case 110 may include second groove portions 113a formed in the first reinforcing portions 113 together with the first groove portions 114a of the second reinforcing portions 114 so as to support entirety of one sides of the electrification plates 120 in the length direction of the electrification plates 120.

In addition, a first corresponding portion 112 that is convex or concave may be formed in the case 110, and a second corresponding portion 133 corresponding to the first corresponding portion 112 may be formed in the fixing member 130 and be assembled to the first corresponding portion 112.

In addition, the fixing member 130 may include a pair of first fixing portions 131 formed so as to support both surfaces of the electrification plate 120.

In addition, second and third fixing portions 132 and 116 each supporting both surfaces of the electrification plate 120 may be formed in the fixing member 130 and the case 110, respectively.

Further, a wire support portion 134 supporting the wire 140 may be formed in the fixing member 130.

In addition, the wire support portion 134 may include a first support portion 134a having a "⊏" shape and supporting the wire 140 provided to be spaced apart from the electrification plate 120 and be in parallel with the electrification plate 120 and a second support portion 134b supporting the wire 140 so that the wire 140 is bent and extends between neighboring electrification plates 120.

In addition, the fixing member 130 may include a blocking portion 135 protruding to block between the electrification plate 120 and the wire 140.

In another general aspect, an electrical dust collecting apparatus 1000 includes: the electrification device 100 as described above; and a dust collecting device 200.

In addition, the dust collecting device 200 may collect the dust particles electrified in the electrification device 100 by an electrical attractive force or may be a filter passing only air therethrough and collecting only the dust particles.

DETAILED DESCRIPTION OF MAIN ELEMENTS

| | | | |
|---|---|---|---|
| 1000: | electrical dust collecting apparatus | | |
| 100: | electrification device | | |
| 110: | case | | |
| 111: | seating portion | | |
| 112: | first corresponding portion | | |
| 113: | first reinforcing portion | 113a: | second groove portion |
| 114: | second reinforcing portion | | |
| 114a: | first groove portion | | |
| 115: | first protrusion portion | 116: | second protrusion portion |
| 116: | third fixing portion | | |
| 120: | electrification plate | | |
| 130: | fixing member | | |
| 131: | first fixing portion | 132: | second fixing portion |
| 133: | second corresponding portion | | |
| 134: | wire support portion | | |
| 134a: | first support portion | 134b: | second support portion |
| 135: | blocking portion | | |
| 140: | wire | | |
| 200: | dust collecting device | | |

DETAILED DESCRIPTION OF EMBODIMENTS

Hereinafter, an electrification device 100 having the configuration as described above and an electrical dust collecting apparatus 1000 including the same will be described in detail with reference to the accompanying drawings.

Figure 1:
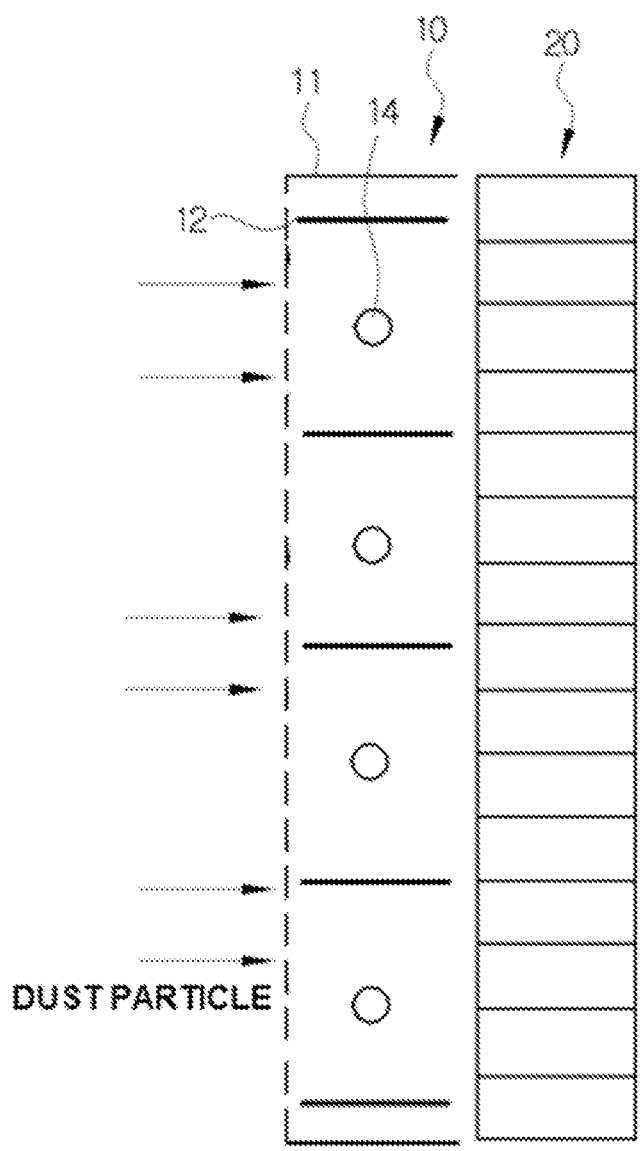
FIGS. 1 and 2 are, respectively, a plan view and a partial cross-sectional view illustrating a dust collecting device of an electrical dust collecting apparatus according to the related art.
Figure 2:
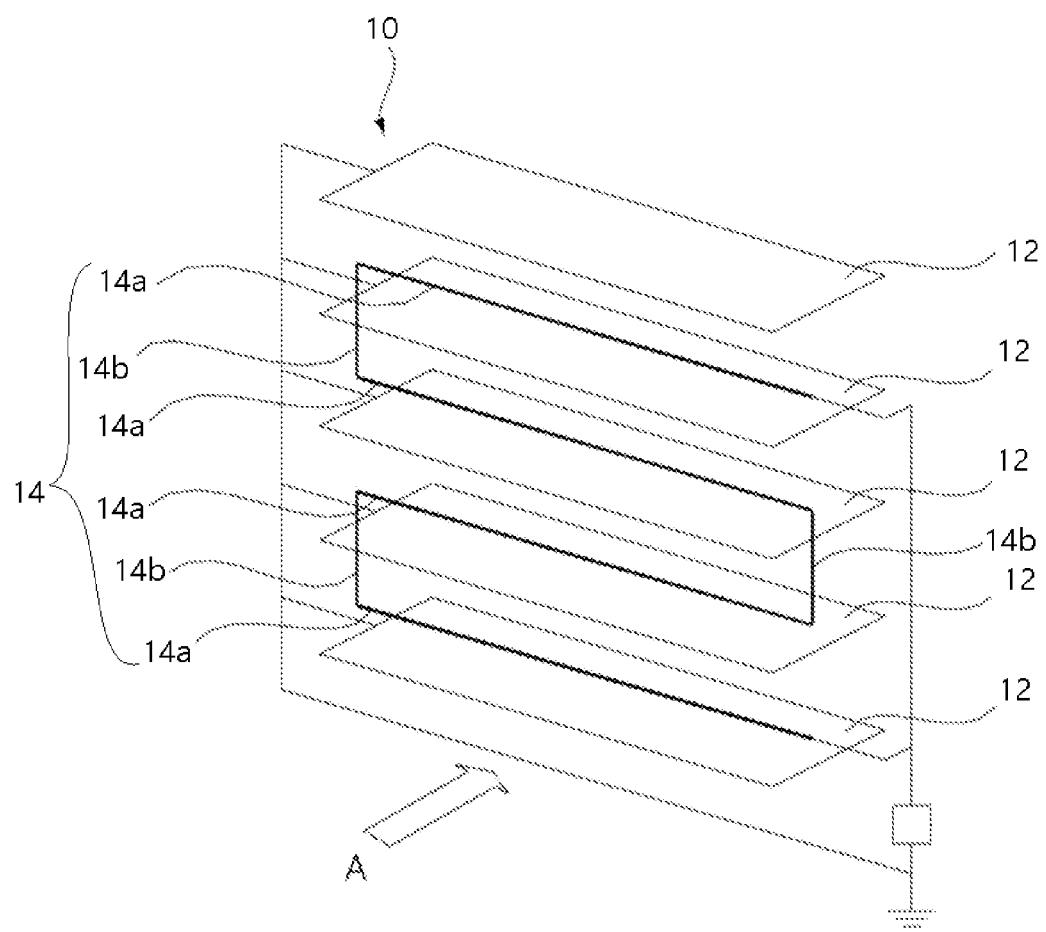
Figure 3:
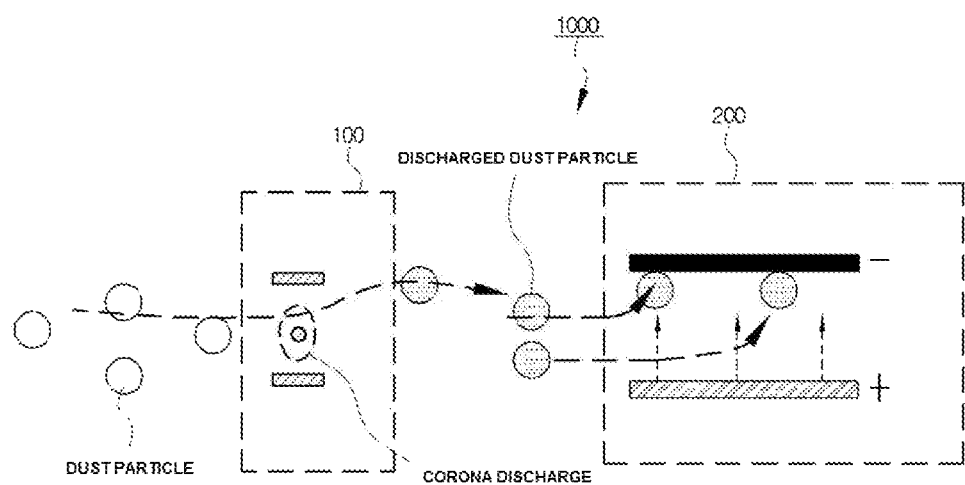
FIG. 3 is a view illustrating an electrical dust collecting apparatus according to the present invention.
Figure 4:
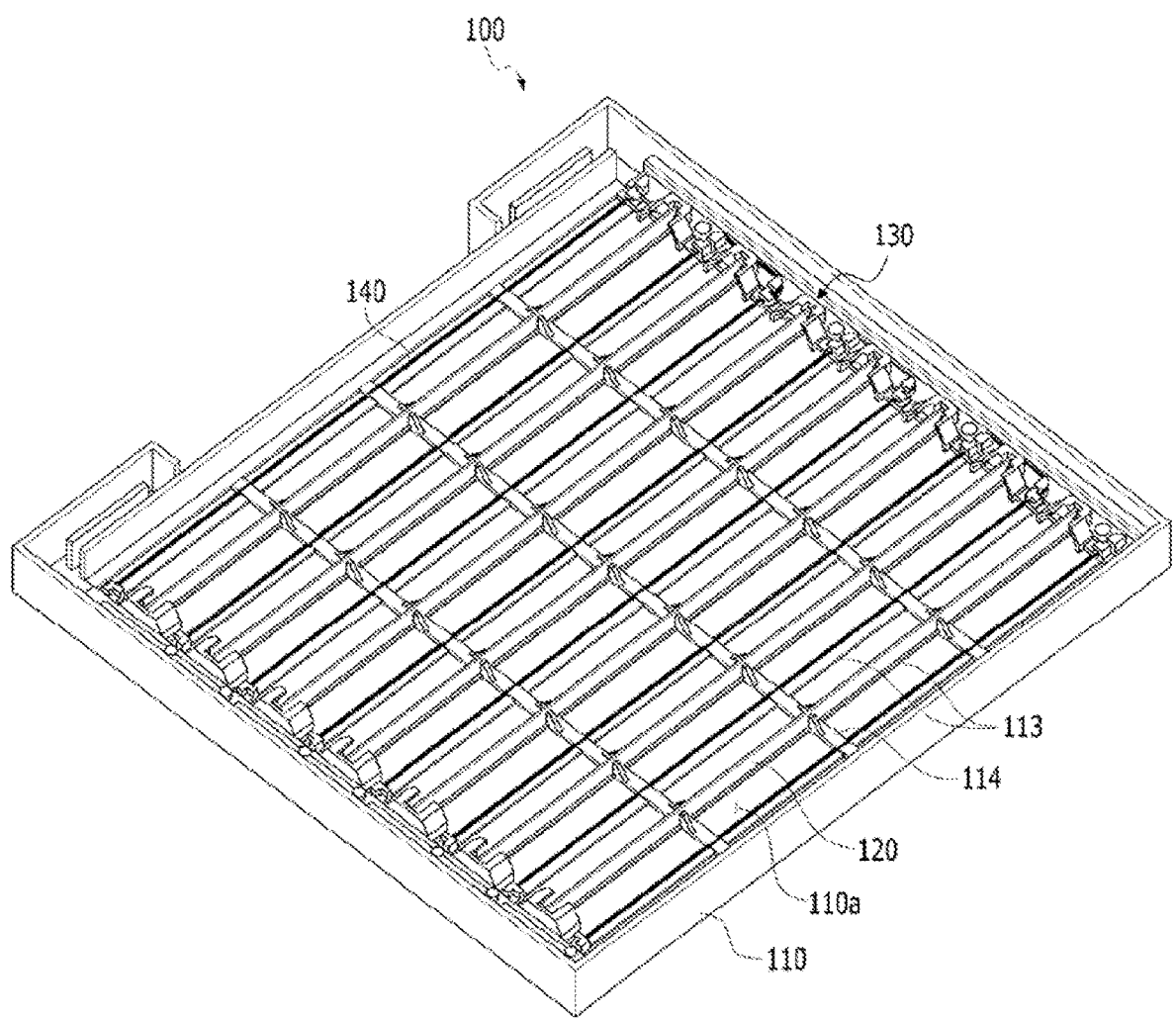
FIGS. 4 and 5 are, respectively, a perspective view and a partially enlarged view illustrating an electrification device according to the present invention.
Figure 5:
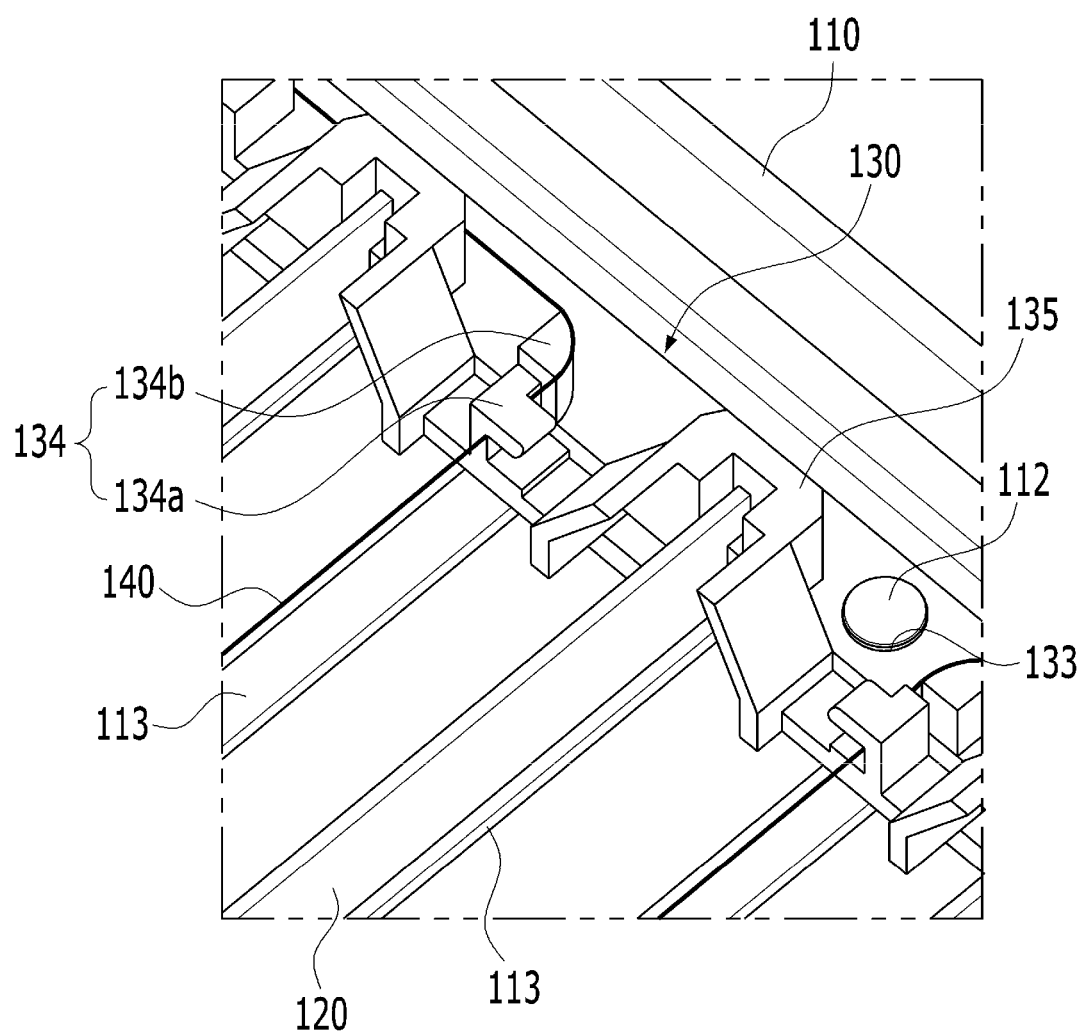
Figure 6:
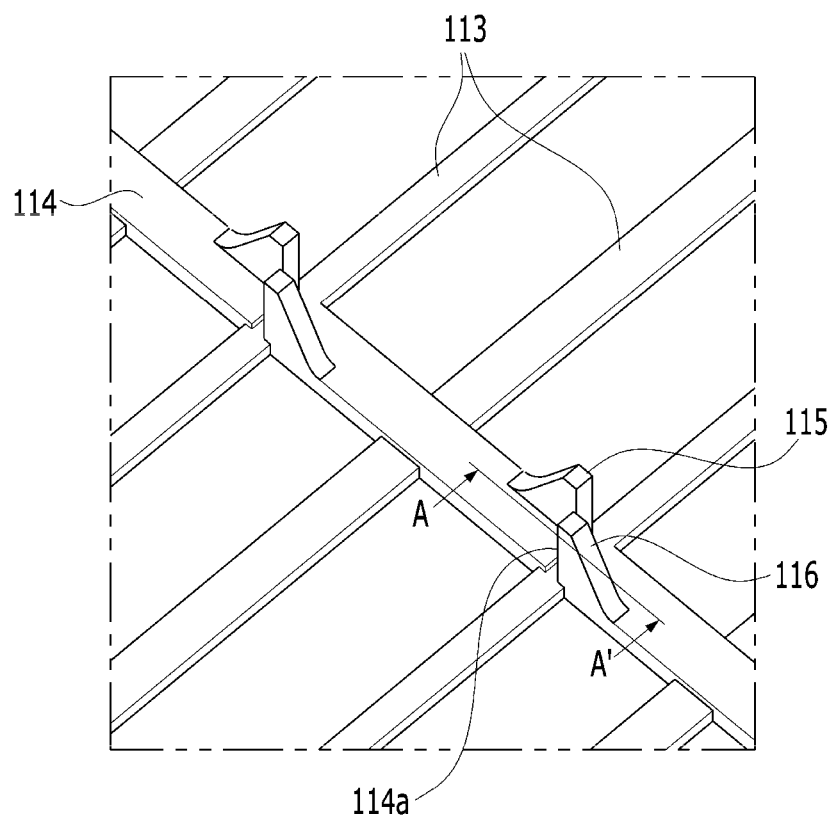
FIGS. 6 and 7 are, respectively, a partial perspective view illustrating and a cross-sectional view taken along line A-A' of a case of the electrification device according to the present invention (formation regions of first and second reinforcing portions).
Figure 7:
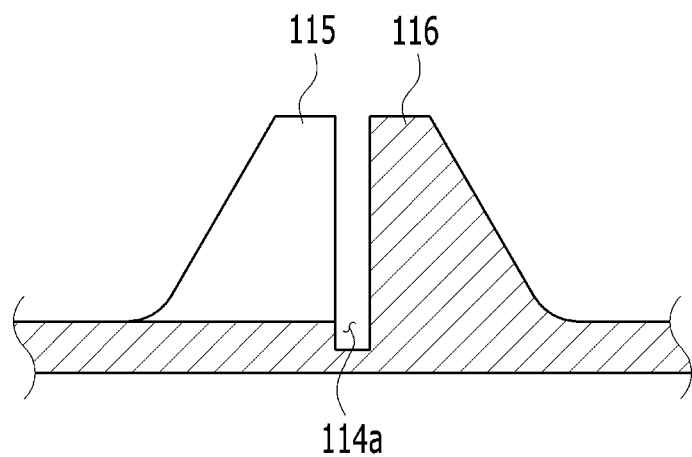
Figure 8:
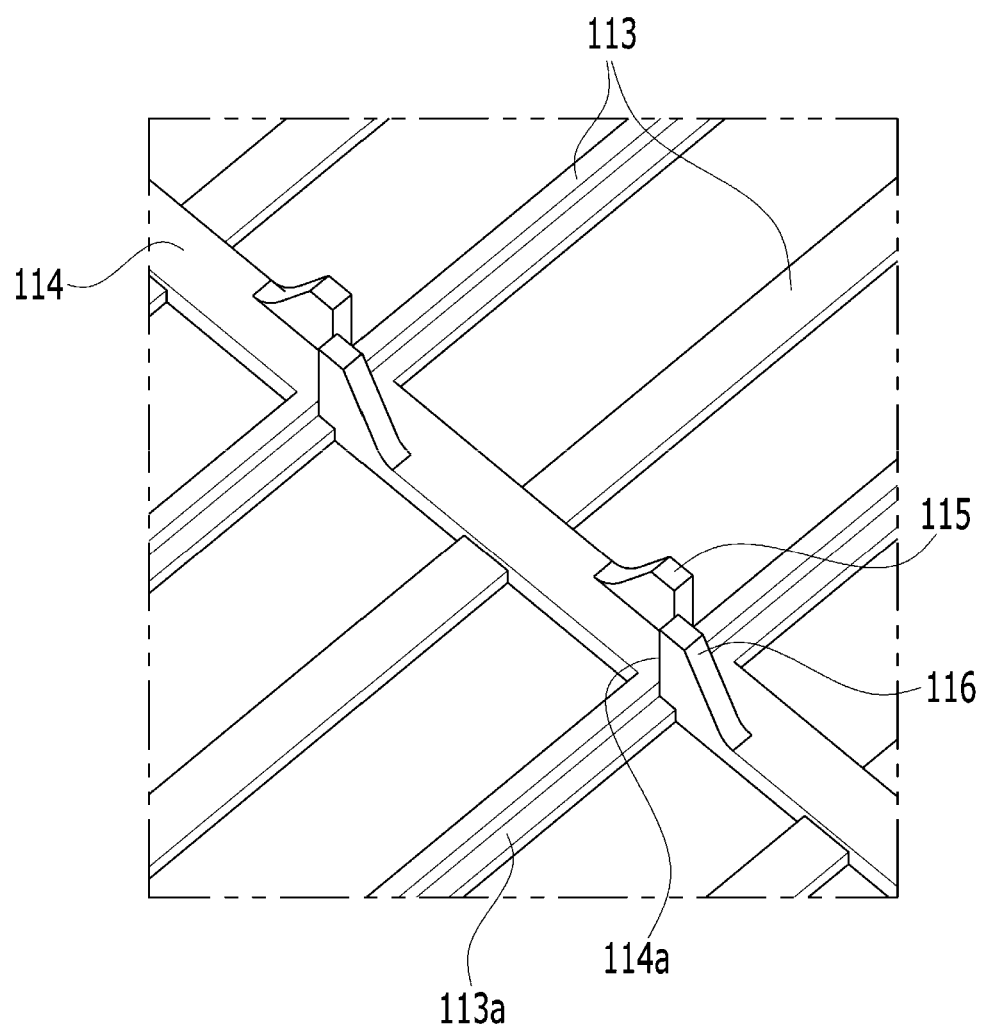
FIG. 8 is a partial perspective view illustrating another case of the electrification device according to the present invention.
Figure 9:
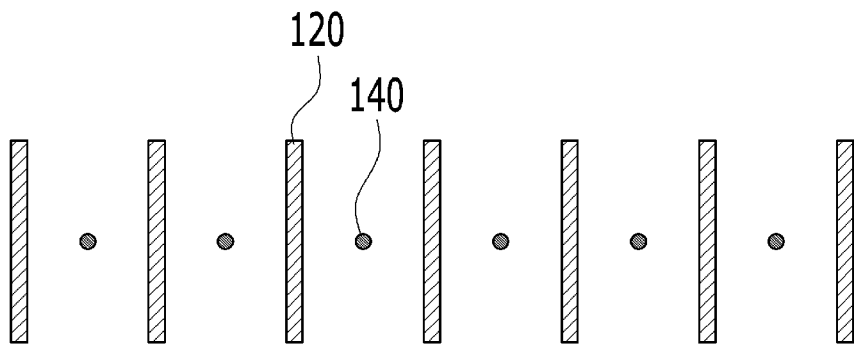
FIG. 9 is a schematic view illustrating the electrification device according to the present invention.
Figure 10:
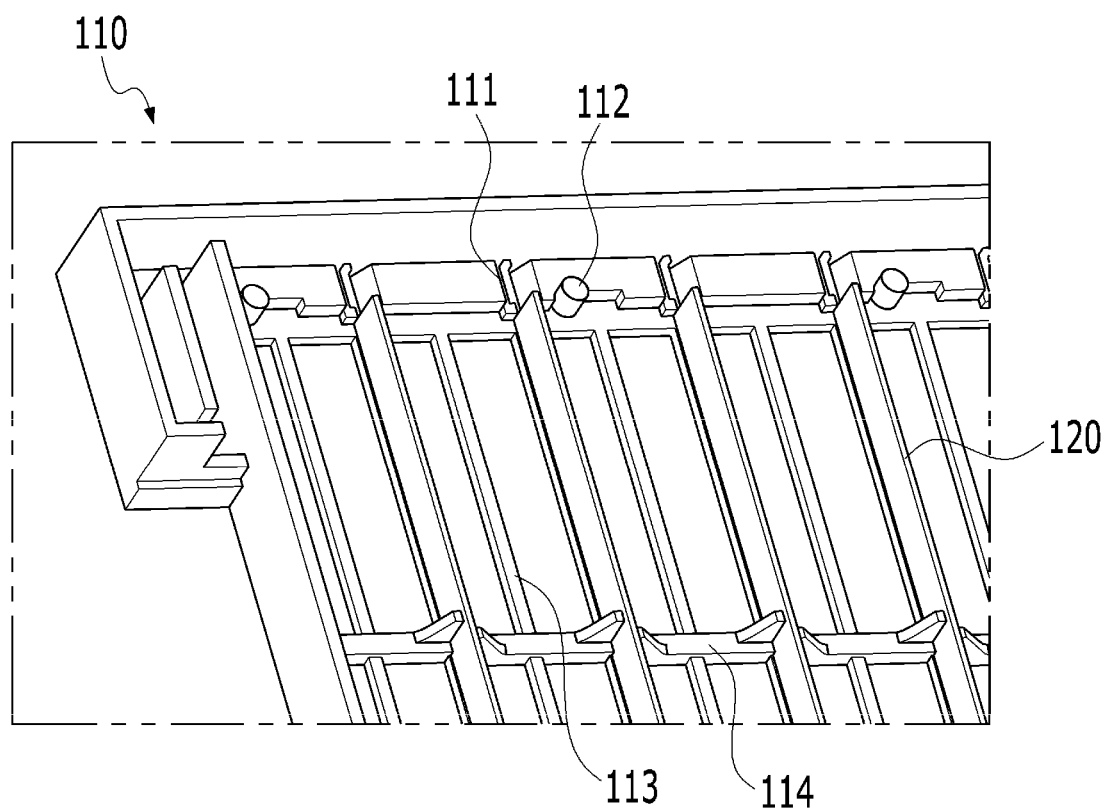
FIG. 10 is a view illustrating a mounted state of the case and an electrification plate of the electrification device according to the present invention.
Figure 11:
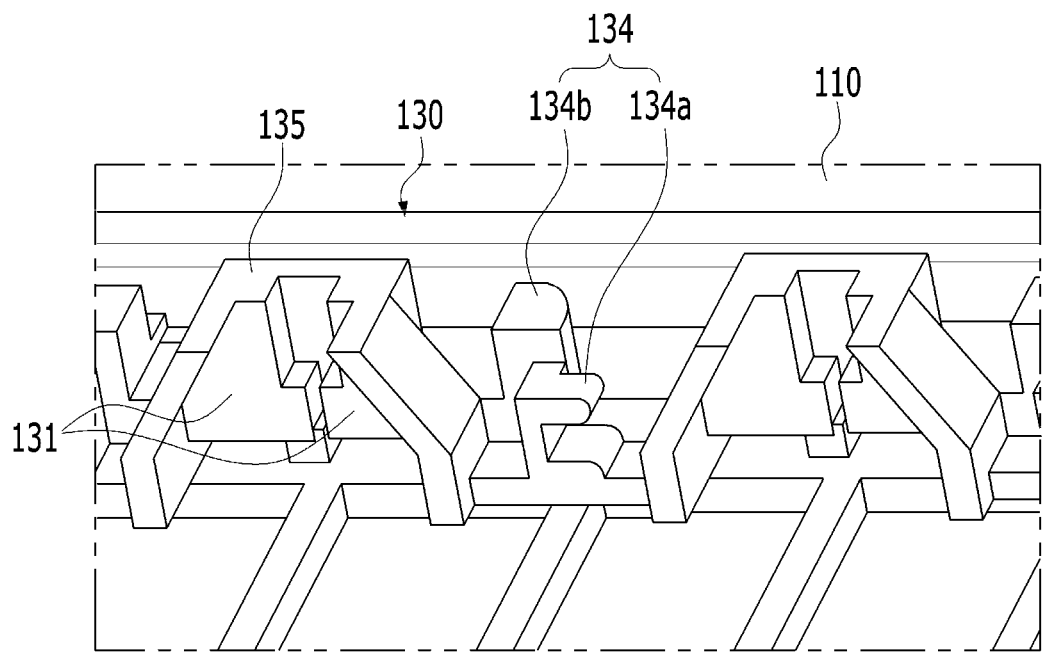
FIGS. 11 and 12 are views illustrating forms of the case and a fixing member of the electrification device according to the present invention.
Figure 12:
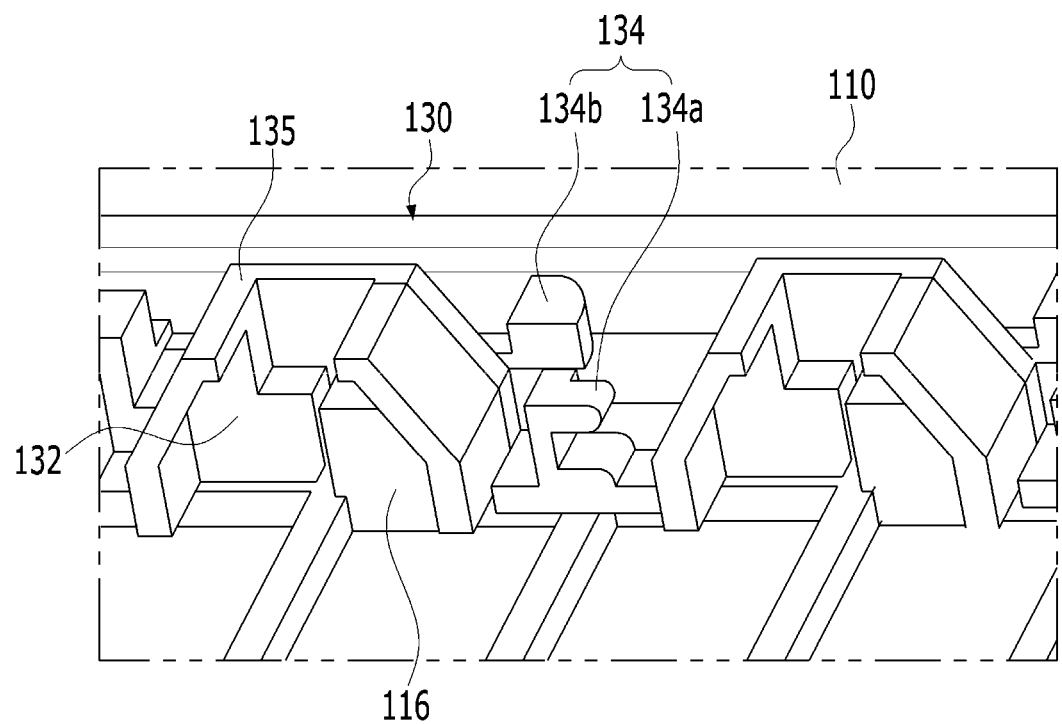

FIG. 3 is a view illustrating an electrical dust collecting apparatus 1000 according to the present invention, FIGS. 4 and 5 are, respectively, a perspective view and a partially enlarged view illustrating an electrification device 100 according to the present invention, FIGS. 6 and 7 are, respectively, a partial perspective view illustrating and a cross-sectional view taken along line A-A' of a case of the electrification device 100 according to the present invention (formation regions of first and second reinforcing portions 113 and 114), FIG. 8 is a partial perspective view illustrating another case 110 of the electrification device 100 according to the present invention, FIG. 9 is a schematic view illustrating the electrification device 100 according to the present invention, FIG. 10 is a view illustrating a mounted state of the case 110 and an electrification plate 120 of the electrification device 100 according to the present invention, and FIGS. 11 and 12 are views illustrating forms of the case 110 and a fixing member 130 of the electrification device 100 according to the present invention.

The electrical dust collecting apparatus 1000 according to the present invention includes an electrification device 100 and a dust collecting device 200. The electrification device 100 applies electric charges to dust particles introduced from the outside to electrify the dust particles through a corona discharge phenomenon, thereby allowing the dust particles to have selected electric charge characteristics. First, the dust collecting device 200 may be formed to be capable of collecting the dust particles passing through the electrification device 100 to have the selected electric charge characteristics by an electrical attractive force. In this case, the dust collecting device 200 may be a filter formed of several materials having electrical properties. In addition, second, the dust collecting device 200 may be a filter passing air therethrough and collecting only the dust particles, such as a non-woven filter. In addition, the electrification device 100 and the dust collecting device 200 may be coupled to each other in a direction in which the dust particles are introduced and electrified.

Hereinafter, the electrification device 100 of the electrical dust collecting apparatus 1000 according to the present invention will be described in more detail.

The electrification device 100 is configured to include a case 110, electrification plates 120, a wire 140, and fixing members 130.

The case 110, which is a basic body forming the electrification device 100, and is formed in a shape of a frame hollowed in a direction in which dust particles are introduced. In this case, the case 110 may include a plurality of first reinforcing portions 113 formed in order to reinforce durability in a direction in which the electrification plates 120 are provided, and further include second reinforcing portions 114 formed in a direction perpendicular to the first reinforcing portions 113. The first reinforcing portions 113 and the second reinforcing portions 114 may be formed within a range in which they do not hinder a flow of air. An example in which the number of first reinforcing portions 113 is fourteen and the number of second reinforcing portions is three is illustrated in FIG. 4, but the electrical dust collecting apparatus 1000 according to the present invention is not limited thereto.

The electrification plates 120 are coupled to the case 110, have a shape of a plate parallel with a direction in which the dust particles move, and are provided in the plural. The electrification plate 120 is primarily coupled to (seated in) the case 110, and is secondarily and finally coupled to the case 110 by fixing of the fixing member 130 and the case 110.

First, a form in which the electrification plates 120 are seated in the case 110 will be described.

Concave seating portions 111 are formed in the case 110 so that both end portions of the electrification plates 120 are seated (see FIG. 10). The seating portions 111 are portions into which both end portions of the electrification plate 120 are inserted.

In addition, in the case 110, the first reinforcing portions 113 may be formed so as to support one sides of the electrification plates 120 in the direction in which the dust particles move. In this case, some or all of the first reinforcing portions 113 may be formed so as to support one sides of the electrification plates 120, and an example of the first reinforcing portions 113 supporting one side of the electrification plate 120 and general first reinforcing portions 113 are alternately formed is illustrated in FIG. 4.

In addition, in the case 110, first protrusion portions 115 and second protrusion portions 116 may be formed on the second reinforcing portions 114. The first protrusion portions 115 and the second protrusion portions 116, which are portions protruding form the second reinforcing portions 114 and supporting both surfaces of the electrification plates 120, protrude from a region in which the second reinforcing portions 114 are formed in a length direction of the electrification plates 120 to support the electrification plates 120. In this case, the first protrusion portions 115 and the second protrusion portions 116 may be provided so as to be spaced apart from each other by a predetermined distance in the length direction of the electrification plate 120 so that the electrification plate 120 is easily mounted.

In this case, the case 110 may include concave first groove portions 114a formed between the first protrusion portions 115 and the second protrusion portions 116 of the second reinforcing portions 114 so that one sides of the electrification plates 120 are further inserted (see FIG. 7).

In addition, the case 110 may include second groove portions 113a formed in the first reinforcing portions 113 so that the entirety of one sides of the electrification plates 120 may be inserted, together with the first groove portions 114a (see FIG. 8).

That is, in the electrical dust collecting apparatus 1000 according to the present invention, both ends of the electrification plates 120 are seated in the seating portions 111 in the case 110 of the electrification device 100, predetermined regions of one sides of the electrification plates 120 are inserted into the first groove portions 114a and the second groove portions 113a, such that the electrification plates 120 are supported by the first reinforcing portions 113, and both surfaces of the electrification plates 120 are supported by the first protrusion portions 115 and the second protrusion portions 116 of the second reinforcing portions 114, such that the electrification plates 120 may be maintained in a fixed state at accurate positions.

The wire 140, which is a portion lengthily formed between the electrification plates 120, is disposed to be spaced apart from the electrification plates 120 and be in parallel with the electrification plates 120. The wire 140 may be provided in a form in which a single wire 140 is bent in the entirety of the electrification device 100. The wire 140 applies a high voltage to the dust particles introduced into the case 110. In more detail, the dust particles are introduced into regions between the electrification plates 120 and the wire 140 within the case 110, and the wire 140 may be positioned at centers between the plurality of electrification plates 120 to allow uniform electrification to be generated (see FIG. 9).

The fixing member 130 is coupled to the case 110 and supports both end portions of the electrification plate 120 and the wire 140. The fixing member 130 is formed of an insulating material, and is coupled to the case 110 to support the electrification plate 120 and the wire 140, thereby allowing the electrification plate 120 and the wire 140 to be fixed at accurate positions. The fixing member 130 may have a form in which a pair of first fixing portions 131 supporting both surfaces of the electrification plate 120 are formed, as illustrated in FIG. 11. In addition, as illustrated in FIG. 12, a second fixing portion 132 supporting one side of the electrification plate 120 may be formed in the fixing member 130 and a third fixing portion 116 supporting the other side of the electrification plate 120 may be formed in the case 110, so as to support both surfaces of the electrification plate 120 together with the case 110. That is, the fixing member 130, which is a component supporting predetermined regions of both end portions of the electrification plate 120, allows the electrification plate 120 to be fixed at an accurate position.

In addition, a wire support portion 134 supporting the wire 140 is formed in the fixing member 130. The wire support portion 134 may include a first support portion 134a and a second support portion 134b. The first support portion 134a has a "⊏" shape so that the wire 140 is provided to an accurate position between the plurality of electrification plates 120, and the wire 140 is seated in the first support portion 134a. That is, the wire 140 may be fixed at the accurate position through the first support portion 134a. The second support portion 134b is a portion supporting the wire 140 so that the wire 140 is bent and extends between neighboring electrification plates 120, in a region in which the fixing member 130 is formed. Therefore, the single wire 140 is bent, such that the wire 140 may be provided between the plurality of electrification plates 120. The second support portion 134b may have a form in which it includes a curved portion so as to be able to easily guide the wire 140.

In this case, the fixing member 130 is formed of an insulating material and prevents abnormal electrification between the electrification plate 120 and the wire 140, and particularly, it is preferable that a blocking portion 135 may further protrude between the first and third fixing portions 131 and 116 supporting the electrification plate 120 and the wire support portion 134 supporting the wire 140 to improve stability.

Meanwhile, the fixing member 130 and the case 110 may be coupled to each other in various manners. As an example, a first corresponding portion 112 that is convex or concave may be formed in the case 110, and a second corresponding 133 portion corresponding to the first corresponding portion 112 may be formed in the fixing member 130. In FIGS. 4 and 5, the first corresponding portion 112 having a convex shape is formed in the case 110 and the second corresponding portion hollowed so that the first corresponding portion 112 is inserted thereinto is formed in the fixing member 130 is illustrated.

The manufacturing of the electrification device of the electrical dust collecting apparatus 1000 according to the present invention will be described. First, the electrification plates 120 are seated so as to be inserted into the seating portions 111, the first groove portions 114a, the second groove portions 113a, the first protrusion portions 115, and the second protrusion portions 116. Next, the fixing members 130 are fixed to the case 110, and the wire 140 is then mounted in the seating portions 111 of the case 110.

Therefore, the electrical dust collecting apparatus 1000 according to the present invention has uniform electrification performance by fixing the electrification plates 120 and the wire 140 at the accurate positions using the fixing members 130 coupled to the case 110 to support both end portions of the electrification plates 120 and the wire 140.

Therefore, the electrification device and the electrical dust collecting apparatus including the same according to the present invention may have uniform electrification by fixing an electrification plate and a wire at accurate positions using a fixing member coupled to a case to support both end portions of the electrification plate and the wire.

Particularly, in the electrification device and the electrical dust collecting apparatus including the same, a position of an electrification plate may be accurately supported through a fixing member (or a fixing member and a case) and protrusion portions and a single wire may be supported by a wire support portion so that it may be bent and extend between neighboring electrification plates.

Further, in the electrification device and the electrical dust collecting apparatus including the same, a fixing member may surround and fix both end portions of an electrification plate and perform an insulation role, and a blocking portion may block between the electrification plate and a wire to prevent abnormal electrification between the electrification plate and the wire adjacent to the electrification plate, thereby enabling stable electrification and improving entire electrification efficiency.

The present invention is not limited to the abovementioned exemplary embodiments, but may be variously applied. In addition, the present invention may be variously modified by those skilled in the art to which the present invention pertains without departing from the gist of the present invention claimed in the claims.

What is claimed is:

1. An electrification device for an electrical dust collecting apparatus, applying electric charges to dust particles introduced from the outside, comprising:
   a case having a frame shape;
   electrification plates coupled to the case to electrify dust particles and having a shape of a plate parallel with a direction in which the dust particles move;
   a wire disposed spaced apart from the electrification plates and in parallel with the electrification plates and having a high voltage applied thereto; and
   a fixing member coupled to one surface of the case and supporting the electrification plates and the wire;
   wherein the fixing member includes a pair of first fixing portions formed so as to support as to support a front surface and a back surface of each of the electrification plates; and
   a wire support portion supporting the wire;
   wherein the fixing member further includes a blocking portion protruding to block between the electrification plate and the wire,
   wherein the wire support portion includes a first support portion having a "c" shape and supporting the wire provided to be spaced apart from the electrification plates and in parallel with the electrification plates and a second support portion supporting the wire so that the wire is bent and extends between neighboring electrification plates.

2. The electrification device for the electrical dust collecting apparatus of claim 1, wherein concave seating portions are formed in the case so that both end portions of the electrification plates are seated.

3. The electrification device for the electrical dust collecting apparatus of claim 2, wherein first reinforcing portions connecting one side and an other side of the case to each other in a direction in which the electrification plates are mounted; and second reinforcing portions connecting one side and the other side of the case in a direction perpendicular to the first reinforcing portions are formed in the case.

4. The electrification device for the electrical dust collecting apparatus of claim 3, wherein the first reinforcing portions support one side of the electrification plates in a direction in which the dust particles move.

5. The electrification device for the electrical dust collecting apparatus of claim 3, wherein the case includes first protrusion portions protruding from the second reinforcing portions and supporting the front surface of the electrification plates and second protrusion portions protruding from the second reinforcing portions and supporting the back surface of the electrification plates.

6. The electrification device for the electrical dust collecting apparatus of claim 5, wherein the first protrusion portions and the second protrusion portions are provided in the second reinforcing portions so as to be spaced apart from each other by a predetermined distance in a length direction of the electrification plates.

7. The electrification device for the electrical dust collecting apparatus of claim 6, wherein the case includes concave first groove portions formed between the first protrusion portions and the second protrusion portions of the second reinforcing portions so that lower sides of the electrification plates are inserted.

8. The electrification device for the electrical dust collecting apparatus of claim 7, wherein the case includes second groove portions formed in the first reinforcing portions together with the first groove portions of the second reinforcing portions so as to support entirety of the lower sides of the electrification plates in the length direction of the electrification plates.

9. An electrical dust collecting apparatus comprising:
the electrification device of claim 1; and
a dust collecting device.

10. The electrical dust collecting apparatus of claim 9, wherein the dust collecting device collects the dust particles electrified in the electrification device by an electrical attractive force.

11. The electrical dust collecting apparatus of claim 9, wherein the dust collecting device is a filter passing only air therethrough and collecting only the dust particles.

* * * * *